Dec. 11, 1934.   H. V. RAU   1,983,879

FASTENER CAP

Filed May 18, 1933   2 Sheets-Sheet 1

INVENTOR
Henry V. Rau
BY
Ramsey & Kent
his ATTORNEYS

Dec. 11, 1934. H. V. RAU 1,983,879
FASTENER CAP
Filed May 18, 1933 2 Sheets-Sheet 2

INVENTOR
Henry V. Rau
BY
Ramsey & Kent
HIS ATTORNEYS

Patented Dec. 11, 1934

1,983,879

UNITED STATES PATENT OFFICE 1,983,879

FASTENER CAP

Henry V. Rau, Amityville, N. Y., assignor to Edwin B. Stimpson Company, Brooklyn, N. Y., a corporation of New York Application May 18, 1933, Serial No. 671,659

4 Claims. (Cl. 24—220)

The present invention relates to the art of metal working and more especially to a fastener cap.

The present invention especially relates to non-circular form caps.

Circular form caps are usually made by a simple drawing and closing process but this method of making caps is not well adapted to the manufacture of non-circular outlined caps. It has been the custom of the art in non-circular outlined caps to form a star shaped blank with separate arms for each side or portion of the non-circular cap and then these arms were bent over the back of the cap to form the opening for engaging the fastener member to be covered by the cap. In the prior art structures, the reason for forming the arms was to take account of the large amount of excess metal in the folded over part of the cap.

The present invention which relates to the production of non-circular caps differs distinctly from the prior art in that a cap is produced by drawing and folding operations and wherein the metal adjacent the meeting point of angularly disposed sides is folded or corrugated so that the excess metal flows in the corrugations which are definitely spaced relative to the shape of the cap and thereby any buckling or distorting of the cap shape is avoided. Furthermore, the corrugations stiffen the holding portion of the cap and provide a much stronger and more satisfactory cap than is produced by the prior art wherein side arms are folded inward to form the holding members of the cap. These side arms of the prior art caps act as individual members when resisting forces tend to displace the caps. In the cap of the present invention the metal in the face of the cap surrounding the fastener opening is an integral unbroken metal wall of great strength and rigidity and therefore is much stronger than the construction of the prior art non-circular caps.

The disclosure herewith is merely illustrative, and, therefore, it is to be understood that the present invention may be carried out in structures other than those specifically illustrated herewith.

Figure 1:
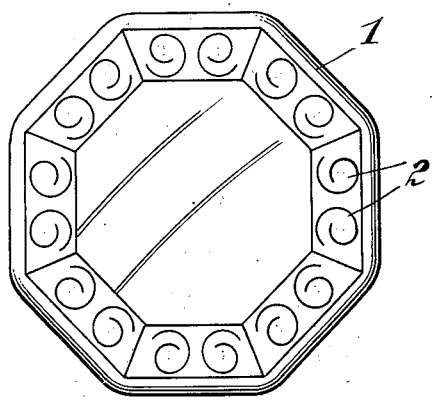
Fig. 1 is a plan view of the back of a fastener cap in accordance with the present invention.

The form of cap illustrated herewith is an octagonal shaped cap. It is to be understood, however, that the present invention is applicable to other non-circular forms of fastener caps and preferably such forms as are of polygon shape.

In the production of a polygon shaped cap by methods heretofore used in the art, difficulty has been encountered because the drawn metal has been substantially non-uniform around a central opening and the distance from the angles to the center of the cap is longer than the distance measured from the middle of a side to the center of the cap. To overcome these difficulties the art has gone to a sectionized face of the cap made up of individual arms. The present invention comprises a method of producing a drawn and formed cap from one continuous edged blank wherein the difficulties of the prior art have been overcome.

The various steps hereinafter specifically described in detail in the production of the present cap have been shown in the drawings by simplified constructions and wherein the novel features only are illustrated. The holding dies, etc., necessary for the production of the cap are very well known to those skilled in the art and are omitted herefrom for purposes of clarification.

Fig. 1 illustrates the back of a finished fastener cap which may be provided with a band of ornamentation 2.

Figure 2:
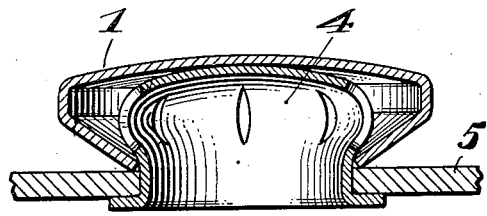
Fig. 2 illustrates the closure cap in use over a fastener member.

Fig. 2 shows the fastener cap 1 locked in position over the expanded fastener socket 4 which is driven through the material 5 to which the fastener is secured.

Figure 3:
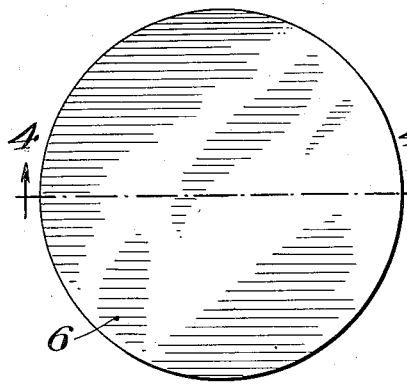
Fig. 3 illustrates the circular blank comprising the first step in the manufacture of this cap.
Figure 5:
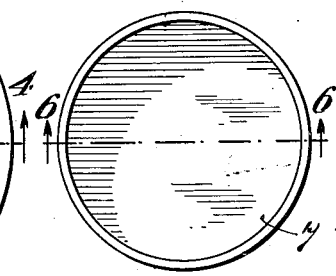
Fig. 5 is a plan view of the first drawing step in producing the present cap.
Figure 7:
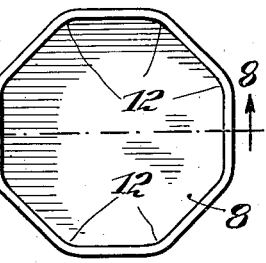
Fig. 7 is a plan view of the second drawing operation to produce an octagonal shaped cap.
Figure 4:
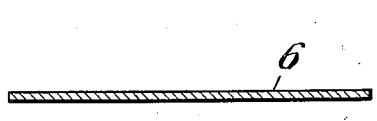
Fig. 4 is a section line on 4—4 of Fig. 3.
Figure 6:
Fig. 6 is a section on line 6—6 of Fig. 5.
Figure 8:
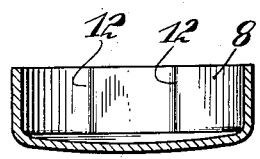
Fig. 8 is a sectional view on line 8—8 of Fig. 7.
Figure 9:
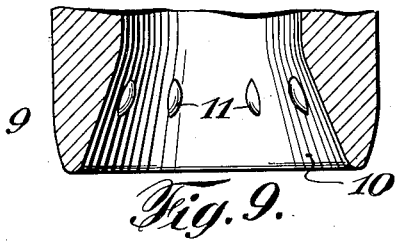
Fig. 9 is a sectional view through a portion of the forming die for the first forming operation.
Figure 12:
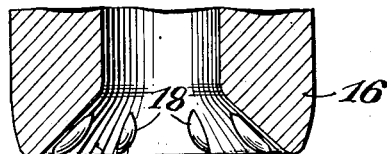
Fig. 12 is a sectional view of the forming point on a die for the second forming operation.
Figure 10:
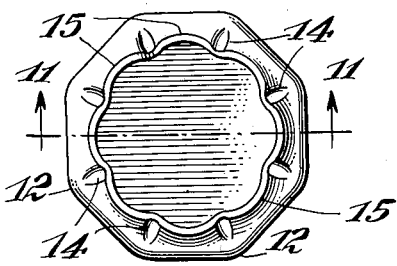
Fig. 10 is a plan view of the blank of an octagonal cap after the same has been formed by the die shown in Fig. 9.
Figure 13:
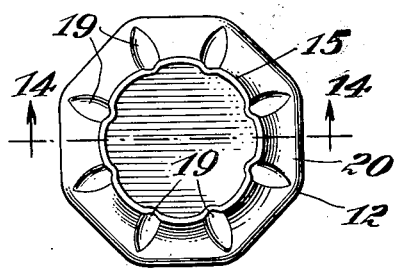
Fig. 13 is a plan view of an octagonal cap after the second forming operation has been completed.
Figure 11:
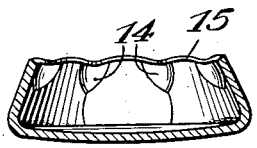
Fig. 11 is a sectional view on line 11—11 Fig. 10.
Figure 14:
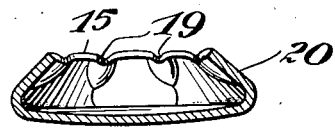
Fig. 14 is a section on line 14—14 of Fig. 13.
Figure 15:
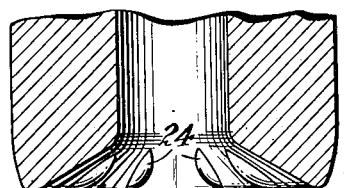
Fig. 15 is a sectional view through the point of the final forming die.
Figure 17:
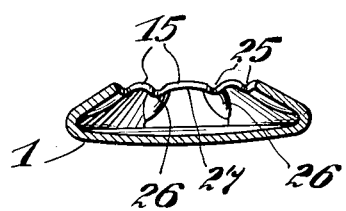
Fig. 17 is a sectional view on line 17—17 of Fig. 16.
Figure 16:
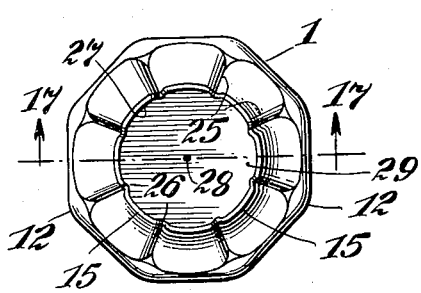
Fig. 16 is a plan view of the face of a diagonal cap in finished form.

In the steps of manufacturing the octagonal shaped cap shown in Fig. 1, the material from which the cap is formed is first stamped out in the shape of a flat circular blank 6 illustrated in Figs. 3 and 4. This circular blank is subjected to a drawing operation to comprise a circular cup 7 illustrated in Figs. 5 and 6. The circular cup 7 is subjected to a second drawing operation which produces an octagonal cup 8 illustrated in Figs. 7 and 8. The octagonal cup 8 is then struck on the top of the side walls by a forming punch 9 while the blank 8 is held in a die. The forming punch 9 is provided with a funnel shaped forming surface 10. This forming surface 10 is provided with forming ribs 11 which, for an octagonal shaped cap, are located at equal intervals of 45° around the center of the punch and each of these forming ribs is positioned on the surface 10 in such manner as to encounter the metal of the side wall of the octagonal cup 8 at each angular corner 12 on the octagonal cup 8. As the punch 9 descends against the cup 8, the ribs 11 on the punch force the angular corners 12 inwardly in the form of valleys 14 shown in Fig. 10. This leaves bowed out portions 15 between the valleys 14. In the next forming operation, the second forming punch 16 is provided with a forming surface 17 on which are ribs 18 slightly larger and longer than the ribs 11 on the first forming device 9. The ribs 18 are located in identically the same position as are the ribs 11 in relation to the axis of the punch so that when the second forming punch 16 descends against the blank, which has been shaped by the first forming operation, the ribs 18 encounter the valleys 14 and slightly enlarge and lengthen these valleys into the valleys 19 of the blank 20 illustrated in Figs. 12 and 13. It will be observed that the opening in the face of the blank is now approaching a circular contour. The third and final forming punch is provided with a final forming surface 22 which has thereon enlarged ribs 24. These enlarged ribs, like ribs 11 and 18 of the preceding punches, are located to strike into the valleys 19 of the blank 20. However, the ribs 24 enlarge these valleys into the final valleys 25. It will be observed from Figs. 15 and 16 that the bottom of the valleys 25 are nearer the back of the cap than are the crests of the bowed out portions 15. It will also be noted that the valleys 25 run from the angular corners 12 which are farthest from the center 28. Since the bottoms of the valleys 25 are pushed over more than the top of the bows 15, the edges 26 adjacent the valleys are substantially the same distance from the center 28 as are the edges 27 of the upstanding bows 15, even though the actual length, as measured from the edge of the cap of the valleys 25 and the bows 15 are the same. This results in a substantially circular opening 29 in the octagonal shaped cap 1.

It will also be noted that the metal surrounding the opening 29 is continuous and unbroken, and is corrugated by the alternation of the valleys 25 and the bows 15, which greatly strengthens and stiffens the metal in the cap so that when the fastener socket 4 is expanded in the cap, the edges of the circular opening 29 tightly grip the side walls of the fastener socket and securely lock the parts together.

Having described my invention, what I claim is:

1. A polygonal shaped cover cap for a fastener comprising a unitary sheet metal member having a back portion and an overturned continuous flange portion surrounding a fastener opening, said cap having a definite practical number of sides, valleys in said flanged portion and extending from said opening toward each angular corner formed by the meeting of the polygonal sides.

2. A polygonal shaped metal cover cap for a fastener, comprising a continuous edged metal member having a back portion and an overturned flanged portion surrounding a fastener opening, said cap having a definite practical number of sides, the metal on radial lines extending from the corners formed by the meetings of the sides being nearer to the back portion than the metal between the sides and said opening.

3. A polygonal shaped metal cover cap for a fastener comprising a back portion and a continuous in-turned flanged portion surrounding a fastener opening, said cap having a definite practical number of sides, the metal on radial lines leading from the corners of the polygon being corrugated inwardly toward the back.

4. A non-circular cap of polygonal form for covering a fastener comprising a sheet metal cap having a polygonal shaped back member with a definite practical number of sides connected with an integral flange having a fastener opening therein, the metal of the flange adjacent said opening being corrugated and with the valleys of the corrugations extending radially toward the angular corners of the cap.

HENRY V. RAU.